United States Patent
Zamani et al.

(10) Patent No.: US 9,787,408 B2
(45) Date of Patent: Oct. 10, 2017

(54) APPARATUS AND METHOD FOR UNIFIED MITIGATION OF CORRELATIVE ADDITIVE AND MULTIPLICATIVE NOISE

(71) Applicants: Mahdi Zamani, Ottawa (CA); Jeebak Mitra, Ottawa (CA); Zhuhong Zhang, Ottawa (CA); Chuandong Li, Ottawa (CA); Hossein Najafi, Ottawa (CA); Demin Yao, Ottawa (CA)

(72) Inventors: Mahdi Zamani, Ottawa (CA); Jeebak Mitra, Ottawa (CA); Zhuhong Zhang, Ottawa (CA); Chuandong Li, Ottawa (CA); Hossein Najafi, Ottawa (CA); Demin Yao, Ottawa (CA)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 84 days.

(21) Appl. No.: 14/876,459

(22) Filed: Oct. 6, 2015

(65) Prior Publication Data
US 2017/0099112 A1    Apr. 6, 2017

(51) Int. Cl.
*H04B 10/61* (2013.01)
*H04L 1/00* (2006.01)
*H04L 25/03* (2006.01)

(52) U.S. Cl.
CPC ....... *H04B 10/6165* (2013.01); *H04L 1/0054* (2013.01); *H04L 25/03178* (2013.01)

(58) Field of Classification Search
CPC ..... H04B 1/10; H04B 10/6165; H04L 1/0054; H04L 1/0059; H04L 1/065; H04L 25/03178; H04L 25/03273
See application file for complete search history.

(56) References Cited

U.S. PATENT DOCUMENTS

| | | | |
|---|---|---|---|
| 6,914,934 B1 * | 7/2005 | Lou | H04L 27/38 375/229 |
| 7,653,126 B2 * | 1/2010 | Yang | H04L 25/03057 375/229 |
| 8,798,128 B2 | 8/2014 | Cai | |
| 8,824,611 B2 | 9/2014 | Eliaz | |

(Continued)

FOREIGN PATENT DOCUMENTS

WO    2014209326 A1    12/2014

OTHER PUBLICATIONS

G. Colavolpe, "Communications over Phase-Noise Channels: A Tutorial Review"; 6th Advanced Satellite Multimedia Systems Conference and 12th Signal Processing for Space Communications Workshop; 2012.

(Continued)

*Primary Examiner* — David B. Lugo
(74) *Attorney, Agent, or Firm* — Gowling WLG (Canada) LLP

(57) ABSTRACT

A digital signal processing method and apparatus is described. The digital processing apparatus comprises a coarse carrier recovery module for performing a coarse carrier compensation of a received modulated signal; and a trellis-based equalization module selectable between a first mode for performing a trellis-based equalization to compensate a residual inter-symbol interference of the received modulated signal and a second mode for performing a trellis-based equalization to compensate a residual phase noise of the received modulated signal.

28 Claims, 10 Drawing Sheets

(56) References Cited

U.S. PATENT DOCUMENTS

| | | | |
|---|---|---|---|
| 9,094,243 B2 | 7/2015 | Hou | |
| 2002/0162074 A1* | 10/2002 | Bickerstaff | H03M 13/2957 |
| | | | 714/792 |
| 2005/0105658 A1 | 5/2005 | Haratsch | |
| 2008/0002791 A1* | 1/2008 | Gratrix | H04L 25/03197 |
| | | | 375/341 |
| 2015/0222456 A1* | 8/2015 | Intrater | H04L 1/0054 |
| | | | 375/227 |

OTHER PUBLICATIONS

G. Colavolpe, T. Foggi and M. Secondini; "Impact of Phase Noise and Compensation Techniques in Coherent Optical Systems"; Journal of Llghtwave Tech., vol. 29, No. 18, pp. 2790-2800; Sep. 2011.

G. Colavolpe, G. Ferrari and R. Raheli; "Noncoherent Iterative (Turbo) Decoding"; IEEE Transactions on Communications, pp. 1488-1498, vol. 48, No. 9, Sep. 2000.

A. Anastasopoulos and K. Chugg, "Adaptive Iterative Detection for Phase Tracking in Turbo-Coded Systems"; in IEEE Transactions on Communications; vol. 49, No. 12, pp. 2135-2144, Dec. 2001.

L. Barletta et al.; "Pilot-Aided Trellis-Based Demodulation"; IEEE Photonics Technology Letters, vol. 25, No. 13, pp. 1234-1237, Jul. 2013.

P.K. Meher and S.Y. Park; "Cordic Designs for Fixed Angle of Rotation"; IEEE Transactions on VLSI Systems; vol. 21, No. 2, pp. 217-228, Feb. 2013.

D. Fertonani et al.; "Reduced-Complexity BCJR Algorithm for Turbo Equalization"; IEEE Transactions on Communications, vol. 55, No. 12, pp. 2279-2287, Dec. 2007.

Fei Sun et al.; "Quasi Reduced State Soft-Output Viterbi Detector for Magnetic Recording Read Channel"; vol. 43, No. 10, pp. 3921-3924, Oct. 2007.

International Search Report of PCT/CN2016/100841 dated Jan. 3, 2017.

* cited by examiner

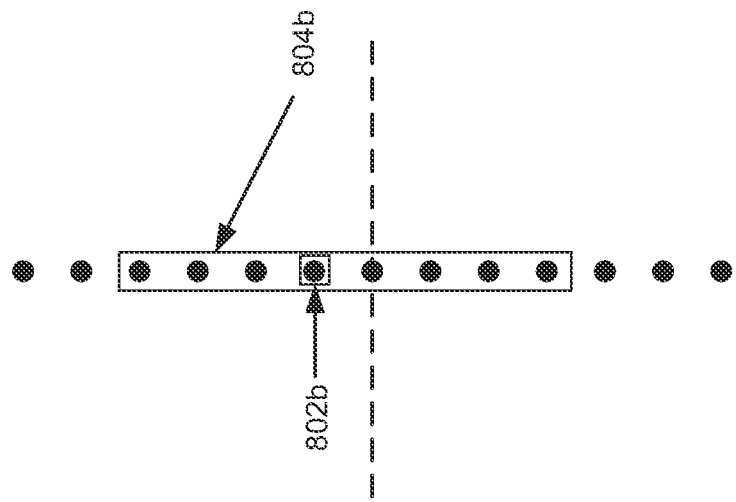
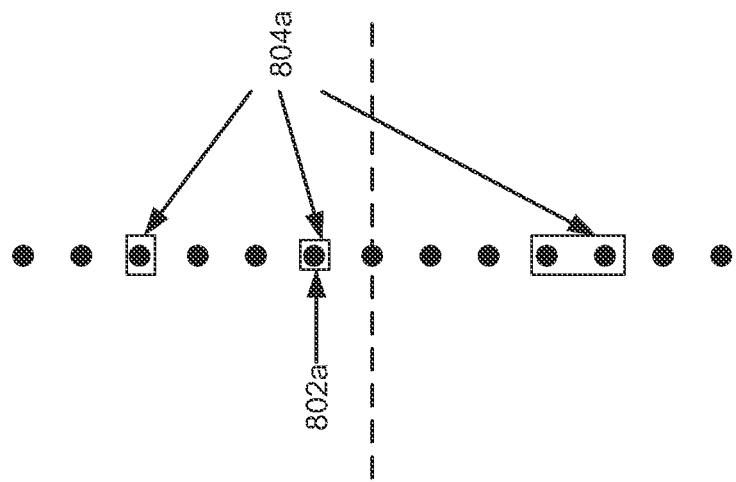

APPARATUS AND METHOD FOR UNIFIED MITIGATION OF CORRELATIVE ADDITIVE AND MULTIPLICATIVE NOISE

TECHNICAL FIELD

The present disclosure relates to unified mitigation of correlative additive and multiplicative noise, and more particularly, to an apparatus and method for unified mitigation of correlative additive and multiplicative noise.

BACKGROUND

Communication systems, particularly high speed transmission systems, face many channel impairments and component impairments. The processing rates of high speed communication systems, sometimes in the range of several hundred gigahertz, impose many constraints on the designs of the communication systems. When designing an apparatus and method for a communication system, there may be trade-offs between low power consumption and reduced silicon area, and high performance.

SUMMARY

The following presents a summary of some aspects or embodiments of the disclosure in order to provide a basic understanding of the disclosure. This summary is not an extensive overview of the disclosure. It is not intended to identify key or critical elements of the disclosure or to delineate the scope of the disclosure. Its sole purpose is to present some embodiments of the disclosure in a simplified form as a prelude to the more detailed description that is presented later.

In one embodiment of the present disclosure, a method is described for digitally processing a modulated signal. The method comprises determining an operation state of a trellis-based equalization engine; and performing a coarse carrier compensation of the modulated signal to obtain a coarse carrier compensated signal. When the determined operation state is a first mode of the trellis-based equalization engine, the method comprises performing a trellis-based equalization to compensate a residual inter symbol interference of the coarse carrier compensated signal using the trellis-based equalization engine; and when the determined operation state is a second mode of the trellis-based equalization engine, the method comprises performing a trellis-based equalization to compensate a residual phase noise of the coarse carrier compensated signal using the trellis-based equalization engine.

In another embodiment of the present disclosure, a digital signal processing apparatus is described. The digital processing apparatus comprises a coarse carrier recovery module for performing a coarse carrier compensation of a received modulated signal; and a trellis-based equalization module selectable between a first mode for performing a trellis-based equalization to compensate a residual inter-symbol interference of the received modulated signal and a second mode for performing a trellis-based equalization to compensate a residual phase noise of the received modulated signal.

BRIEF DESCRIPTION OF THE DRAWINGS

These and other features of the disclosure will become more apparent from the description in which reference is made to the following appended drawings.

FIG. 8A is an illustration of a trellis state reduction scheme in the inter symbol interference mitigation mode, according to an embodiment;

FIG. 8B is an illustration of a trellis state reduction scheme in the residual phase noise mitigation mode, according to an embodiment;

DETAILED DESCRIPTION

Figure 1:
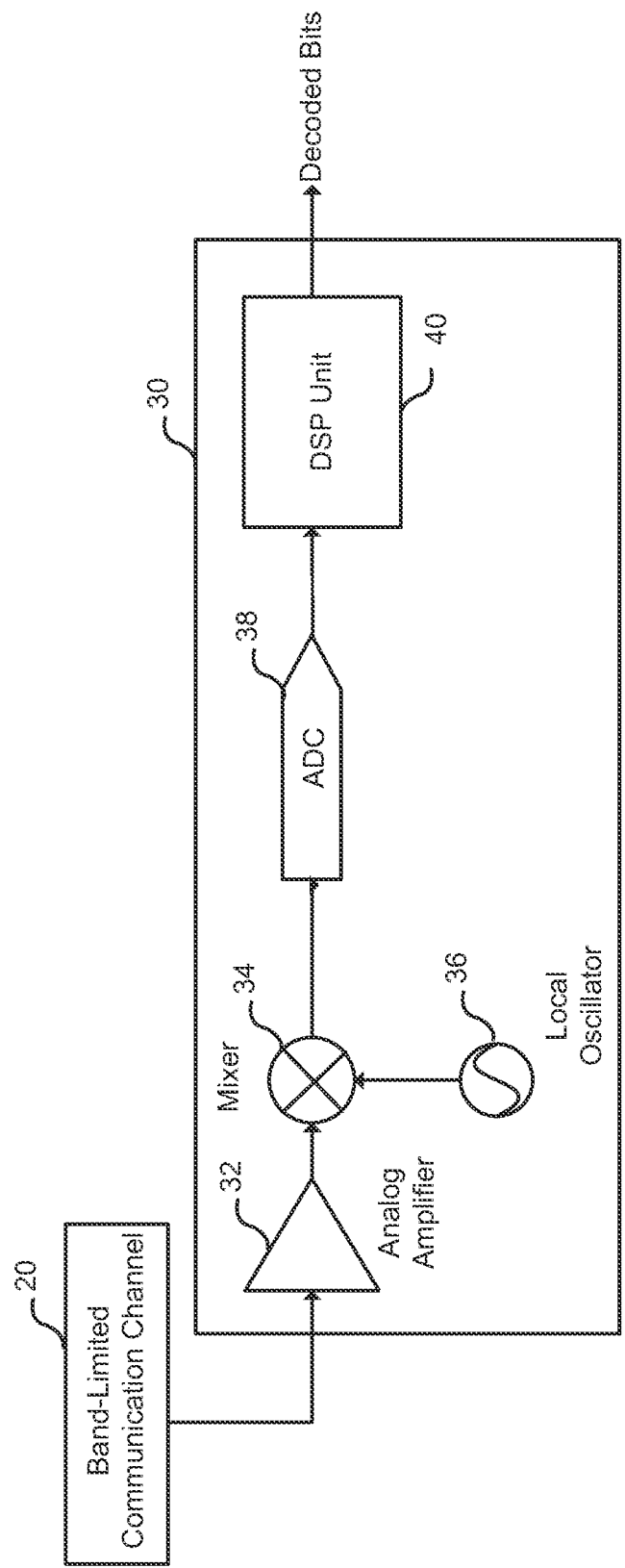
FIG. 1 illustrates possible sources of correlative additive and multiplicative noise in a communication system.

The following detailed description contains, for the purposes of explanation, various illustrative embodiments, implementations, examples and specific details in order to provide a thorough understanding of the invention. It is apparent, however, that the disclosed embodiments may be practiced, in some instances, without these specific details or with an equivalent arrangement. The description should in no way be limited to the illustrative implementations, drawings, and techniques illustrated below, including the designs and implementations illustrated and described herein, but may be modified within the scope of the appended claims along with their full scope of equivalents.

Disclosed herein are methods and apparatuses for unified mitigation of correlative additive and multiplicative noise in communication systems, particularly high speed transmission systems such as coherent optical systems. The methods and apparatuses include a trellis-based equalization module selectable between a first mode for performing a trellis-based equalization to compensate a residual inter-symbol interference (ISI) and a second mode for performing a trellis-based equalization to compensate a residual phase noise (PN).

Although some embodiments make reference to optical systems and particularly coherent optical systems, it should be understood that the described methods and apparatuses are generally applicable to any communication systems. For the purpose of this disclosure, the expression "digital signal processing apparatus" is used to encompass all digital signal processors, digital signal processing devices, circuits, implementations, units, modules, means, whether implemented in hardware, software and/or firmware. A digital signal processing apparatus may comprise an application specific integrated circuit (ASIC), a field-programmable gate array (FPGA), or can be an off-the-shelf digital signal processing (DSP) chip. In accordance with some embodiments of the description, the digital processing apparatus is an optical DSP.

ISI and PN are two possible important impairments that communication systems, particularly high speed transmission systems such as coherent optical systems, can suffer from. The effects of the two impairments can be exacerbated when higher order modulation (HOM) formats are used.

For several communication systems, an effective way to increase the spectral efficiency is to use the HOM formats which can transmit with a higher data rate using the same bandwidth, or transmit with the same data rate using a reduced effective bandwidth. However, use of HOM formats may cause the transmitted signals to be more susceptible to both ISI and PN.

Bandwidth limitations of components, such as band-limited opto-electronic devices, can often cause an ISI in the transmitted signal. This can result in a significant correlative additive noise in the received signal.

Various components as well as the channel itself can also introduce phase noise, resulting in a significant correlative multiplicative noise in the received signal.

For example, local oscillator (LO) frequency offsets (FO) can be a significant source of phase noise. In digital video broadcasting-satellite-second generation (DVB-S2) systems, use of inexpensive low noise blocks in outdoor units, and corresponding tuners in indoor units, can result in a strong phase noise. Additionally, in coherent optical systems, laser line-width (LW) and fiber non-linearity can cause phase noise that deteriorates the system performance. The phase stability of a laser is inversely proportional to its line-width. Similarly, for various wireless systems such as microwave point-to-point (PTP) systems as well advanced cellular access systems that often use HOM, phase noise can be a serious impediment. Phase locked loops (PLLs) can be used to align the phases of the received signals. Specifically, decision directed-PLL (DD-PLL) has been a popular technique to ensure that the system is phase locked with the phase of the transmitted signal and also remove any inadvertent phase noise that may have been introduced by the channel. However, in a phase noise sensitive system, the DD-PLL usually is unable to have a high bandwidth and at the same time maintain overall the PLL stability. This results in some residual phase noise that can be detrimental to system performance. Therefore, methods of effective residual PN compensation in communication systems, particularly high speed transmission systems, are needed.

Since both ISI and PN compensation can require computationally intensive techniques, it is challenging to implement both modules with limited hardware resources and meet the criteria for power consumption, silicon area and the like. As well, existing ISI compensation methods cannot be easily adopted for PN compensation, particularly for transmission systems at speeds on the order of tens to hundreds of gigahertz or more.

FIG. 1 illustrates possible sources of correlative additive and multiplicative noise in a communication system. A transmitted signal passes through a communication channel 20 that is typically band-limited. Through a band-limited channel, the received signal can have negligible power beyond a certain cut-off frequency. The received signal in the receiver 30 is amplified by an analog amplifier 32 before being mixed by a mixer 34 with a local signal generated by a local oscillator 36. The output of the mixer 34 then goes through an analog-to-digital converter (ADC) 38 before being processed by a DSP unit 40. The decoded bits are generated as output. Sources of correlative additive and multiplicative noise in such a communication system include, but are not limited to, the band-limited channel 20, the local oscillator 36, and the ADC 38.

Figure 2:
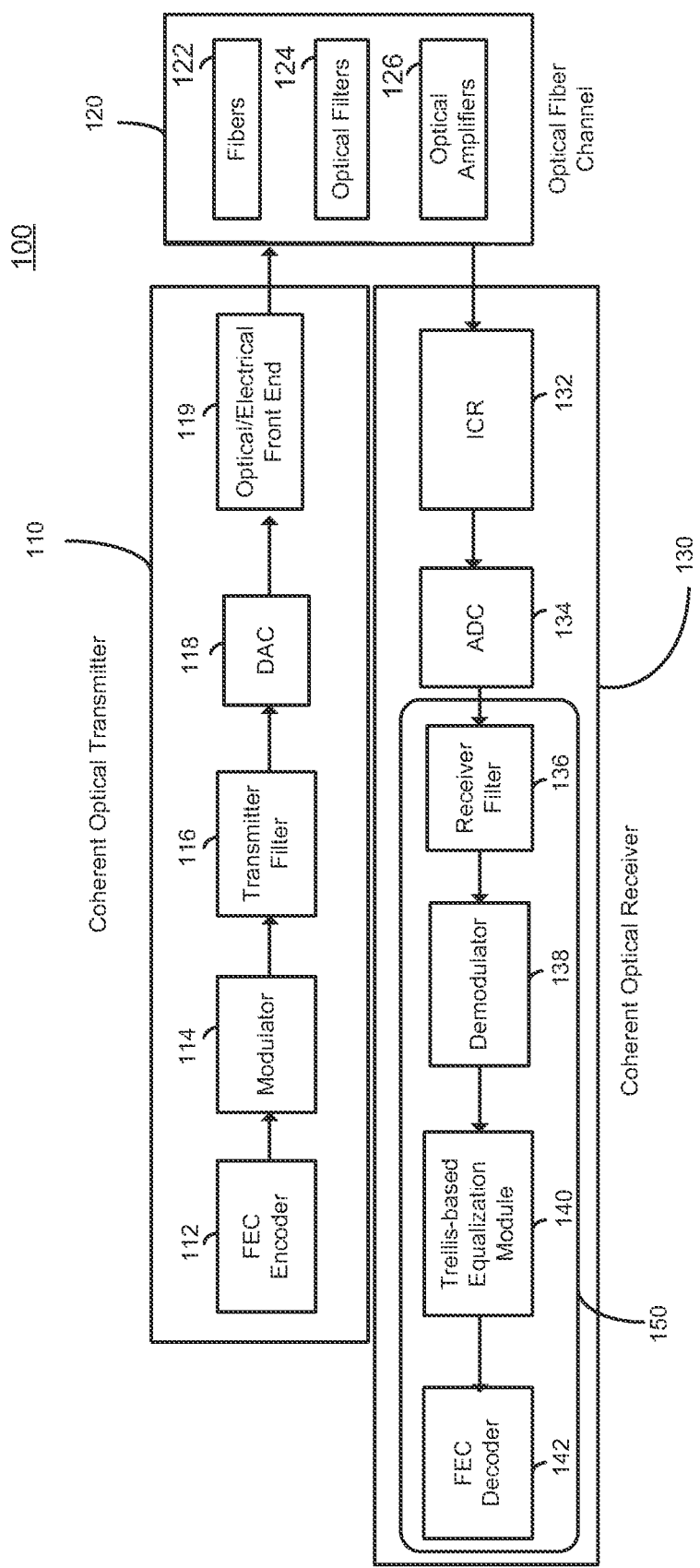
FIG. 2 is a schematic diagram of an embodiment of a coherent optical communication system.

FIG. 2 provides an example of a coherent optical communication system 100, to which the described methods and apparatuses are applicable. The communication system 100 includes a transmitter 110, an optical channel 120, and a receiver 130 arranged as illustrated in FIG. 2.

The transmitter 110 comprises a forward error correction (FEC) encoder 112, a modulator 114, such as an 8, 16, 32, or 64 quadrature amplitude modulator (QAM), a Quadrature Phase Shift Keying (QPSK) modulator, or a modulator with 4 or 8 dimension modulation formats. The modulated signal is conditioned through transmit filtering 116 for pulse shaping to better match the channel and converted to an electric analog signal using a digital to analog converter (DAC) 118 before being converted at an optical/electrical front end 119 to an optical signal suitable for transmission through the optical channel 120. An example of a transmitted optical signal from the transmitter 110 may be transmitted over two orthogonal linear polarizations (X and Y), with each polarization component having two orthogonal phase components (an in-phase I and a quadrature-phase Q). The four components have the same carrier frequency, which is determined by an optical wavelength supplied by a laser.

The optical channel 120 is configured to transport the modulated signal from the transmitter 110 to the receiver 130, and may comprise fibers 122, optical filters 124 and optical amplifiers 126. The optical channel 120 may also comprise one or more cascaded wavelength-selective switches (WSSs). The components of the optical channel 120 can introduce undesired signal changes, such as chromatic dispersion (CD), nonlinear phase noise, polarization mode dispersion (PMD), polarization dependent loss (PDL) and/or gain, state-of-polarization (SOP) rotation, optical additive noise, optical multiplicative noise, or combinations thereof.

The receiver 130 is configured to receive the modulated signal. The receiver 130 may include an integrated coherent receiver (ICR) 132 and an ADC 134 coupled to the ICR 132. The ICR 132 receives the modulated signal and generates one or more signal outputs. The ICR 132 may comprise a local oscillator (LO) (not shown) which generates an optical signal having a carrier frequency that is the same or about the same as that of the received modulated signal. The optical signal generated by the LO is mixed with the received modulated signal and the mixed signal is split into four components (i.e. two polarization components X and Y, each polarization component including an in-phase I and a quadrature-phase Q). The output signals from the ICR 132 may then be converted by an ADC 134 from analog to digital domain and forwarded to a DSP unit 150, which processes the signals and recovers the data in the transmitted modulated signal.

The DSP unit 150 may comprise a receiver filter 136, a demodulator 138 for soft demodulation, and an equalization module 140. The demodulator 138 and the equalization module 140 digitally compensate channel impairments and/or component impairments. Examples of such impairments include, but are not limited to, CD, PMD, PDL, SOP rotations, laser phase noise, jitter, frequency offset, I-Q delay, X-Y delay, and I-Q imbalance. The output of the equalization module 140 is provided to a forward error correction (FEC) decoder 142 which decodes the encoded bits using an iterative decoding approach.

To compensate for the various impairments noted above, the DSP unit 150 may include separate modules for compensating specific impairments.

Figure 3:
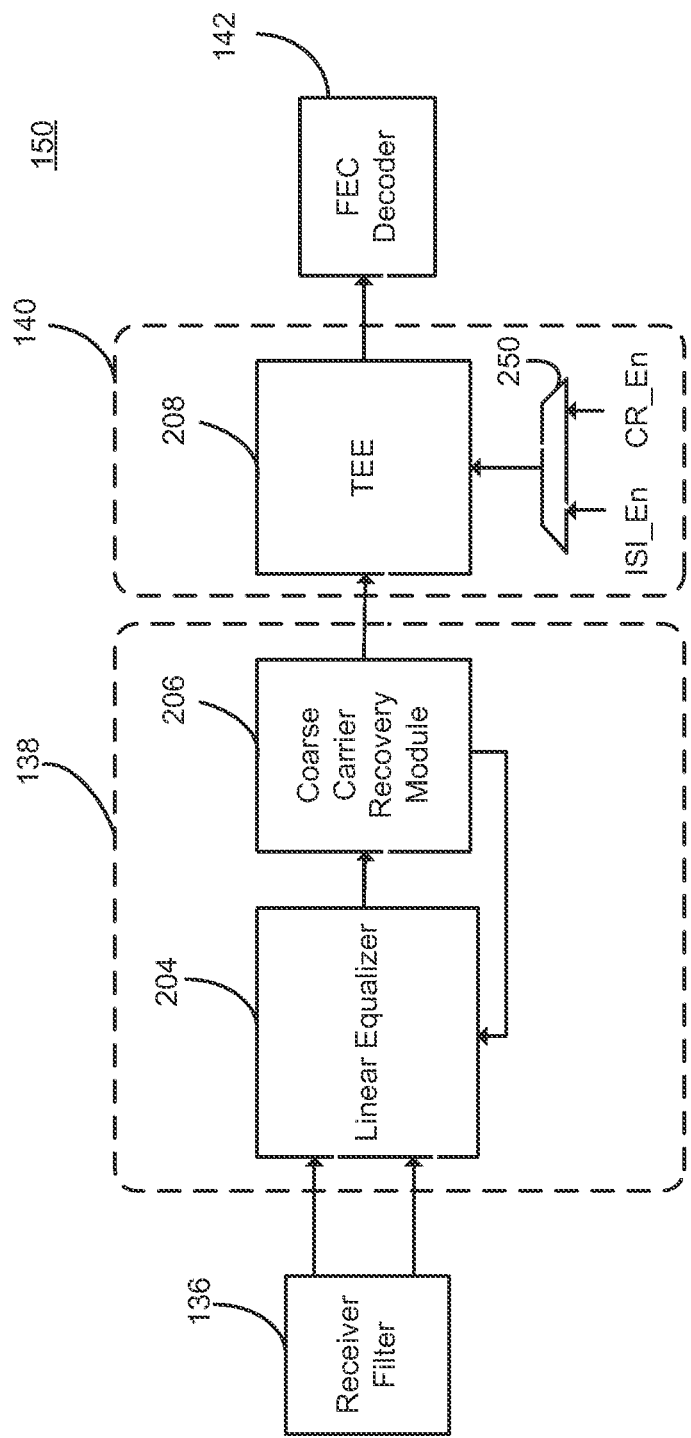
FIG. 3 is a schematic diagram of an embodiment of a digital signal processing unit in a coherent optical communication system.

FIG. 3 is a schematic diagram of the DSP unit 150 used in a coherent optical receiver or transceiver. The demodulator 138 includes a linear equalizer 204. The linear equalizer 204 can include a frequency-domain equalizer (FDEQ), a time-domain equalizer (TDEQ), or both. The FDEQ can address quasi-deterministic impairments, such as CD and match filtering; and the TDEQ can address polarization dependent impairments, such as SOP, PDL and PMD. The TDEQ may be, for example, an adaptive time-domain butterfly structure, e.g., a multiple-input multiple-output finite impulse response (MIMO-FIR) circuit. The linear equalizer 204 may be implemented as one single module or a plurality of modules. For example, the equalizer may include a module for FDEQ and a separate module for TDEQ, and either the FDEQ or the TDEQ may be omitted in some embodiments. After the linear equalizer 204, there may still exist residual ISI that causes performance loss due to limitations of the linear equalizer. Such residual correlative additive noise may have a particularly significant impact when symbol by symbol detectors are used.

The demodulator 138 further includes a coarse carrier recovery module 206, such as a DD-PLL, for performing a coarse carrier recovery of the modulated signal. However, the coarse carrier recovery module 206 may have limited performance due to several reasons including, but not limited to correlative residual PN from high-frequency phase noise sources. As a result, there may exist residual correlative high-frequency impairments at the output of the coarse carrier recovery module 206. Such residual correlative multiplicative noise may have a particularly significant impact on receivers or transceivers operating with high baud rates in band-limited channels.

According to the description, the equalization module 140 is a trellis-based equalization module which includes a trellis-based equalization engine (TEE) 208 for performing a trellis-based equalization to compensate the residual correlative additive and multiplicative noise. The trellis-based equalization module 140 is selectable between a first mode of operation for performing a trellis-based equalization to compensate a residual ISI of the coarse carrier compensated signal ("ISI mitigation mode", or alternatively "correlative additive noise mode") and a second mode of operation for performing a trellis-based equalization to compensate a residual PN of the coarse carrier compensated signal ("PN mitigation mode", or alternatively "correlative multiplicative noise mode").

The equalization module 140 can include a selection module 250, e.g., a mux, for providing a control signal to select a mode of operation. The mode of operation can be predetermined, or selected based on channel conditions or based on which impairment can have a greater impact on the system performance. With reference to FIG. 3, a control signal ISI_En can be used to trigger the ISI mitigation mode of the TEE 208; and a control signal CR_En can be used to trigger the PN mitigation mode of the TEE 208. Under certain channel conditions, the trellis-based equalization module 140 can be bypass-able without processing in either mode. The determination of whether the trellis-based equalization module 140 or the TEE 208 is to be bypassed can be made at any suitable location prior to the equalization module 140, by determining an operation state.

The equalization module 140 is configured to perform a trellis-based equalization depending on the mode of operation. When the mode of operation is the ISI mitigation mode, the TEE 208 is used to compensate the residual ISI in the coarse carrier compensated signal. When the mode of operation is the PN mitigation mode, the TEE 208 is used to compensate the residual PN of the coarse carrier compensated signal. For both modes, the TEE 208 uses a trellis structure comprised of the same number of states and the same trace back length (or symbol block length), as will be explained.

The TEE 208 implements a feed-forward style processing that does not require any iteration between modulator and FEC decoder 142 for a high performance. As will be explained, the TEE 208 uses the same Euclidean distance metric as well as the same add-compare-select (ACS) processing for both modes. The branch metric calculation in the PN mitigation mode is an extension of the branch metric calculation in the ISI mitigation mode, where the extension is an additional term that is added to the same Euclidean distance metric. Furthermore, the overall delay from the output of the coarse carrier recovery module 206 to the output of the equalization module 140 is the same for both modes, thereby maintaining the same throughput for both modes. Furthermore, which data path is selected for the equalization module 140 is independent of modulation format of the received signal.

Figure 4:
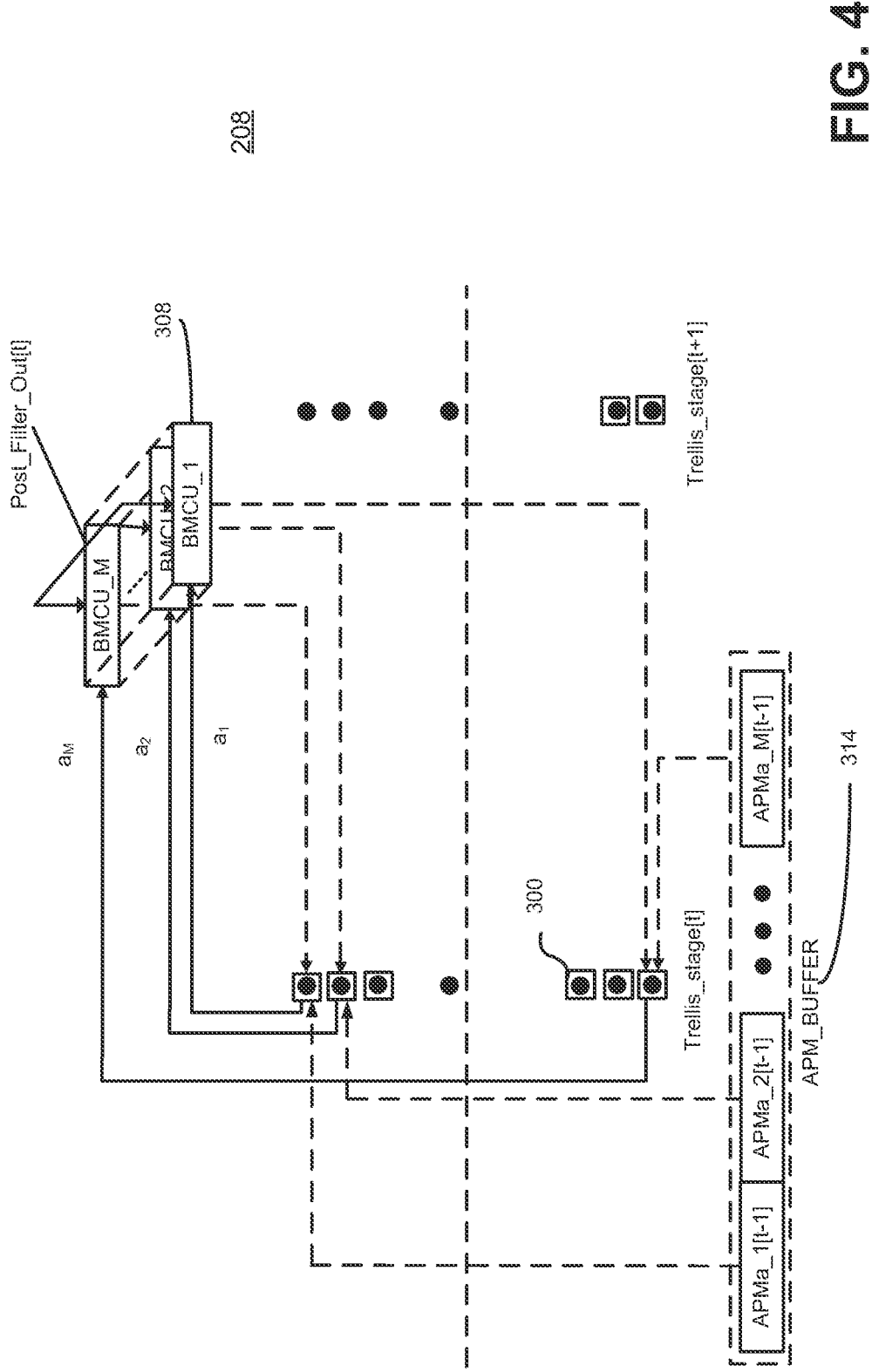
FIG. 4 is a schematic diagram of an embodiment of a trellis-based equalization engine in the inter symbol interference mitigation mode.

FIG. 4 provides a schematic diagram of an embodiment of the TEE 208 in the ISI mitigation mode.

When the channel is primarily affected by ISI (correlative additive noise), the received signal $y_t$ of symbol t may be represented in the following form, assuming adequate symbol synchronization has been established, $$y_t = x_t + n_t + I_t \quad (1)$$

where, $x_t$ represents the transmitted symbol at discrete time t, $n_t$ represents the non-correlative additive noise, and $I_t$ represents the effective ISI. Depending on the channel, either or both of post-cursor and pre-cursor ISI may be encountered. In this particular embodiment, only the pre-cursor ISI is considered by assuming a given symbol is affected only from energies of symbols that have been received prior to it. It should, however, be understood that the design can be applied to also take into consideration the post-cursor ISI. While the linear equalizer 204 is typically used to address ISI, there may still exist residual ISI that causes performance loss due to limitations of the linear equalizer.

In the ISI mitigation mode, the residual ISI can be discretized into M possible combinations of previous symbols with suitable weighting factors for each previous symbol. Denoting the coarse carrier compensated signal from the coarse carrier recovery module 206 at discrete time t as R[t], the branch metric in the ISI mitigation mode for a given state can be expressed as:

$$\frac{|R[t] - \hat{s}_l[t]|^2}{\sigma_t^2} \quad (2)$$

$$\text{where } \hat{s}_l[t] = \sum_{l=0}^{N} w_l s[t-l]$$

is the weighted sum of the current symbol and at least one previous symbol up to a maximum channel memory of N. The branch metric is a Euclidean distance metric normalized over the variance of the non-correlative noise $\sigma^2$.

In the ISI mitigation mode, a channel memory of N (e.g., N=2 or 3) symbols is considered. The trellis structure is comprised of M states (e.g., M=16), where each state in the trellis represents a possible weighted sum of a current symbol and at least one previous symbol. The weighted sum can be obtained by summing the real or imaginary parts of the symbols separately or by summing the complex values of the symbols. Under certain conditions, such as in case when rectangular constellations are used, the operation may be in a low phase noise regime and the phase noise can be adequately addressed using the coarse carrier recovery module 206. In such a case, I and Q independence can be assumed and the branch metric can be simplified by separating the real and imaginary parts of the symbols. In other cases, the Euclidean distance metric in the equation (2) is a complex number calculation. Based on the calculated branch metrics, the TEE 208 is configured to navigate through the trellis structure to compensate the residual ISI of the coarse carrier compensated signal.

The operation of TEE 208 in the ISI mitigation mode is explained with reference to FIG. 4. Each node 300 represents a state. The coarse carrier compensated signal from the coarse carrier recovery module 206 is filtered by a post-filter (not shown in this figure) with the same number of filter taps as the amount of channel memory that is modeled and the post-filtered signal post_filter_output[t] is input to the branch metric calculation units (BMCU) 308 BMCU_1, . . . , BMCU_M. There are M BMCUs corresponding to M states of the trellis. The weighted sums $a_1, \ldots, a_M$ of symbols corresponding to the M states are sent to their respective BMCUs 308 BMCU_1, . . . , BMCU_M. Each BMCU 308 obtains a Euclidean distance metric between the post-filtered signal post_filter_output[t] and a corresponding possible weighted sum $a_1, \ldots, a_M$, according to equation (2). The weights may be determined through a conventional channel estimator employing pilots or by other suitable methods.

For each trellis stage t, state metrics of the previous trellis stage t−1 are buffered in accumulative path metric (APM) units 314 APMa_1[$t-1$], . . . , APMa_M[$t-1$]. Both the state metrics of the previous trellis stage t−1 and the branch metrics of the current trellis stage t obtained by the BMCUs 308 are used to calculate the state metrics of stage t. As will be explained, a reduced set of states may be used to propagate from a trellis stage to a next trellis stage. The trellis structure used in the TEE 208 includes L trellis stages, referred to as the trace back length of the trellis.

Based on the calculated branch metrics, state metrics of the states may be calculated recursively using the principles of the Viterbi algorithm.

Mathematically, the state metric can be obtained by:

$$APM[k,t] = \min_{l=1,\ldots,K}\{APM[l,t-1] + BMCU[l,k,t]\} \quad (3)$$

Figure 5:
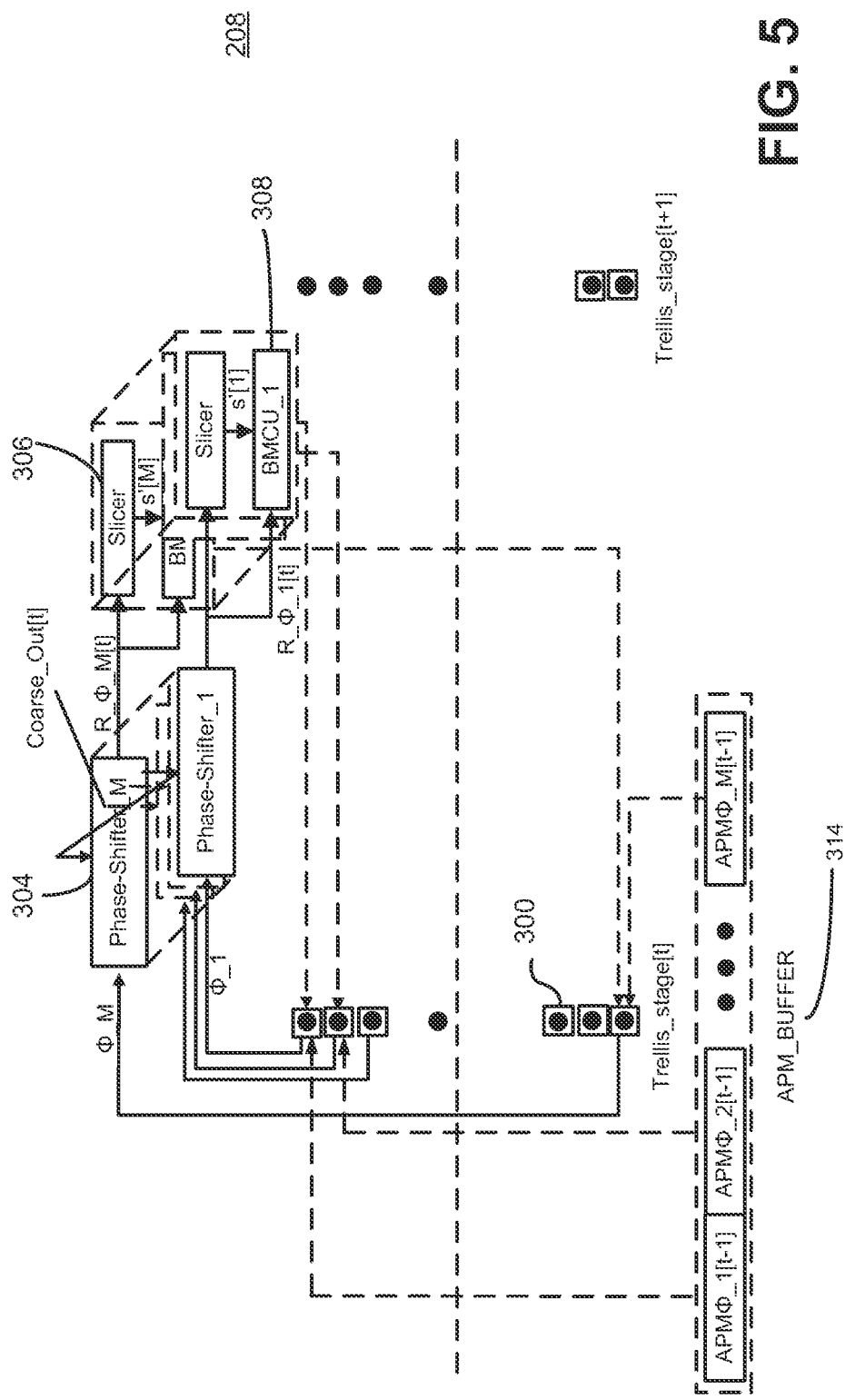
FIG. 5 is a schematic diagram of an embodiment of a trellis-based equalization engine in the residual phase noise mitigation mode.

That is, a state metric APM[k, t] of a state k in a trellis stage t is calculated by obtaining a minimum added sum of the branch metric BMCU[l,k,t] of the branch l connected to the state k added by a state metric APM [l, t−1] of a source state of the branch l. The minimization is taken across all branches l=1, . . . K that can reach state k at time t. In the ISI mode, the number K of branches depends on aspects such as amount of channel memory and whether the considered states are real or complex. The branch that provides the minimum value in the equation (3) is a survived branch and the minimum added sum AP M[k, t] is used as a state metric in a state metric calculation of a next trellis stage n+1. The survived branch in each state is found using the ACS unit. The compensated symbols are obtained during trace back of the trellis or other trellis decoding methods. FIG. 5 is a schematic diagram of an embodiment of the TEE 208 in the PN mitigation mode. The number of states M per trellis stage is the same as in the ISI mitigation mode and the operation also follows the same steps of ACS as in the ISI mitigation mode.

When the channel is primarily affected by phase noise, the received signal $y_t$ of discrete time t can be represented in the following form, assuming adequate symbol synchronization has been established, $$y_t = x_t e^{j\theta_t} + n_t \quad (4)$$

where, $x_t$ represents the transmitted symbol at discrete time t, $n_t$ represents the non-correlative additive noise, and $\theta_t$ is the phase noise. With reference to FIG. 3, a coarse phase noise compensation $\theta_t'$ is applied through the coarse carrier recovery module 206 and a residual PN $\phi_t$ can be represented as $$\phi_t = \theta_t - \theta_t' \quad (5)$$

In the PN mitigation mode, the residual PN $\phi_t$ in the range of [$\phi_{min}, \phi_{max}$] can be discretized into M states. Each state of the trellis structure represents a possible residual phase noise of a symbol. The possible residual phase noise corresponding to a state can be referred to simply as the residual phase state. The residual phase noise jump in each discrete time is quantized to a number of levels (e.g., 3 levels), each represented by a branch. That is, the phase noise at each discrete time is assumed to be one of the three quantized levels (first order Markov process) added to the phase of the previous discrete time. Accordingly, a branch in the trellis structure of the PN mitigation mode represents a possible phase noise jump at a discrete time (or alternatively, in a trellis stage) and connects from a source state to a destination state. The possible phase noise jump corresponding to the branch can be referred to simply as the phase jump.

The maximum and minimum residual PN value may be symmetric around zero, i.e., the residual PN can be either positive or negative. The phase state values may be distributed uniformly or non-uniformly. For example, the trellis may be constructed by having arctan values of the phase states distributed uniformly.

Denoting the coarse carrier compensated signal from the coarse carrier recovery module 206 at discrete time t as R[t], the branch metric in the PN mitigation mode for a given state can be expressed as:

$$BMCU[l, k, t] = \frac{|R[t]e^{j\phi_k} - \hat{s}[t]|^2}{\sigma_n^2} + \frac{|\phi_k - \phi_l|^2}{2\sigma_\Delta^2} \quad (6)$$

$$(l = 1, \ldots, K, k = 1, \ldots, M, t = 1, \ldots, L)$$

where $\phi_k$ is the phase state of state k, $\phi_l$ is the phase state of a source state connected to state k by a branch l, and $\hat{s}[n]$ is the constellation point mapped to $R[n]e^{j\Phi_k}$ in the modulation constellation.

The first term in equation (6) represents the Euclidean distance metric between the rotated signal and the mapped constellation point. The second term in equation (6) represents a probability of the phase jump represented by the branch l. As shown by equation (6), the TEE 208 uses the same Euclidean distance metric as in the ISI mitigation mode, with an additional term as an extension for the PN mitigation mode.

With reference to FIG. 5, each node 300 represents a state, more particularly in the context of the PN mitigation mode, a residual phase state. In the PN mitigation mode, for each state $\Phi\_1, \ldots, \Phi\_M$ in the trellis, the output of the coarse carrier recovery module 206 Coarse_Out[t] is rotated according to the phase state $\Phi\_1, \ldots, \Phi\_M$, by, for example, a corresponding phase-shifter (or alternatively, phase-rotator) 304 phase-shifter_1, . . . , phase-shifter_M.

The rotated version R_Φ_1[t], ..., R_Φ_M[t] of the output of the coarse carrier recovery module 206 is mapped to a corresponding constellation point (e.g., the closest constellation point) for a given modulation, employed in the transmission system. The mapping can be done by a corresponding slicer 306 s'[1], ..., s'[M]. Thereafter, a branch metric is calculated in each of the BMCU 308b BMCU_1, ..., BMCU_M, based on the Euclidean distance metric between the rotated version R_Φ_1[t], ..., R_Φ_M [t] of the output of the coarse carrier recovery module 206 and the mapped constellation point, as well as a probability of the phase jump, according to equation (6).

Similar as in the ISI mitigation mode, for each trellis stage t, state metrics of the previous trellis stage t−1 are buffered in the APM units 314 APMΦ_l[t−1], ..., APMΦ_M[t−1]. Both the state metrics of the previous trellis stage t−1 and the branch metrics of the current trellis stage t obtained by the BMCUs 308 are used for the calculation of the state metrics of stage t. As will be explained, a reduced set of states may be used to propagate from a trellis stage to a next trellis stage. The trellis structure used in the TEE 208 also includes L trellis stages, with the same trace-back length as in the ISI mitigation mode.

Based on the calculated branch metrics, state metrics of the states may be calculated recursively using the principles of the Viterbi algorithm in the same manner as in the ISI mode.

Mathematically, the state metric in the PN mitigation can be expressed by the same equation (3) as in the ISI mitigation mode.

That is, a state metric APM[k, t] of a state k in a trellis stage t is calculated by obtaining a minimum added sum of the branch metric BMCU[l, k, t] of the branch l connected to the state k added by a state metric APM[l, t−1] of a source state of the branch l. The minimization is taken across all branches l=1, ... K that can reach state k at time t. In this particular example of the PN mitigation mode, K=3. The branch that provides the minimum value in the equation (3) is a survived branch and the minimum added sum APM[k, t] is used as a state metric in a state metric calculation of a next trellis stage n+1. The survived branch in each state is found using the ACS unit. The most likely residual phase noise is found during trace back of the trellis or other trellis decoding methods. The found most likely residual phase noise is used to compensate the coarse carrier compensated signal by phase de-rotating the coarse carrier compensated signal based on the estimated residual phase noise.

One of the primary challenges of the high speed transmission system design is that the latency of a DSP data path needs to be contained in order to meet the required throughputs. Sequential detection techniques will invariably add to the latency of the overall data path because no symbol decisions or any other symbol related metric such as log-likelihood ratio (LLR) can be available until the processing has reached the end of the block. In typical frame-based communication systems, a single frame may contain several thousand symbols and therefore when applying sequence detection over the entire block, the systems suffer from high amounts of latency and associated storage requirements for intermediate variables. In order to make the sequence detection techniques amenable to the high speed design, the same trellis structure is used for both ISI and PN mitigation.

However, as can be inferred, implementation of the operation of the TEE 208 has several computational requirements as well as sequential dependencies. Instead of a standard $L_2$ norm that is used when computing the Euclidean distance metric above, one may use a simplified metric by employing an $L_1$ norm as an approximation to the square-root of the Euclidean distance metric. Several computational optimizations can be implemented in order to enable a high-speed implementation of the TEE 208 capable of mitigating ISI and PN based on the same trellis structure.

In the PN mitigation mode as well as in the ISI mitigation mode, the residual ISI compensated signal or the residual PN compensated signal can be further utilized for generation of LLRs to work in conjunction with iteratively decoded FEC 142.

Some communication systems, such as coherent optical systems, can operate with ultra-high baud rates in the scale of tens of gigahertz. For example, the received signal in a coherent optical system may have a baud rate of 25 Ghz to 66 Ghz. The clock rate of the processor may be around hundreds of megahertz. To realize the trellis-based processing in such high baud rate systems, the DSP unit 150 may use a parallel structure for the equalization modules 140 or the TEEs 208. In particular, an output frame of the linear equalizer 204 and the coarse carrier recovery module 206 with a symbol length of F may be divided into P parallel blocks. Each of these blocks with a symbol length F/P is processed in one of the P parallel equalization modules 140 or TEEs 208. The discontinuity of data by dividing the symbol sequence into parallel blocks may cause vague initial state metrics at each parallel equalization module 140 or TEE 208. To address this issue, at the $p^{th}$ parallel equalization module 140 or TEE 208, an initial sequence of the last S symbols of the $(p-1)^{th}$ block may be processed before the F/P symbols of the $p^{th}$ block, where S is less than F/P. It is noted that the TEE module 350 only compensates its own sequence with symbol length F/P, and the S symbols are only used for initialization of the TEE module 350.

Figure 6:
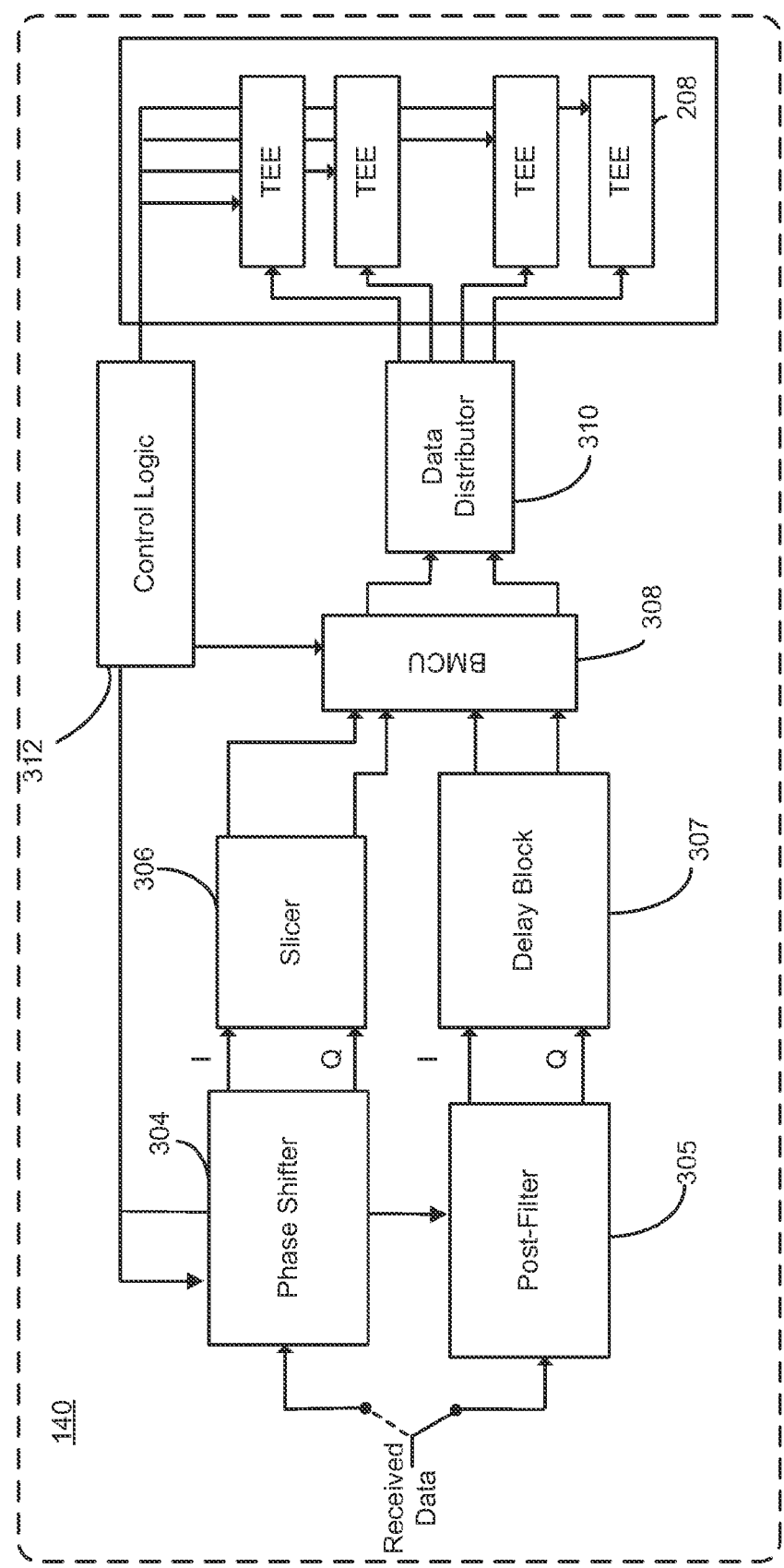
FIG. 6 is a schematic diagram of an embodiment of a parallel structure of the trellis-based equalization engines.

FIG. 6 is a schematic diagram of a parallel structure of TEEs 208, according to one embodiment.

As shown in FIG. 6, an operation state is determined which is used to select the trellis mode of the TEE 208. When the TEE 208 is not to be bypassed, the operation state can be an ISI mitigation mode or a PN mitigation mode of the TEE 208 depending on channel conditions. The output from the coarse carrier recovery module 206 then represents the received data to be input into the equalization module 140.

When the operation state is the PN mitigation mode of the TEE 208, a phase shifter 304 is enabled and the coarse carrier compensated signal is phase-rotated by the phase shifter 304 according to each phase state. The phase rotation may be performed using a known CORDIC circuit or by any other suitable methods. The closest constellation point to this rotated signal can be found, for example, by a slicer 306, such as a QAM slicer. The slicer 306 may be implemented as a look-up-table (LUT) or by any other suitable methods. The branch metrics are then calculated in the BMCU 308.

Alternatively, when the operation state is the ISI mitigation mode of the TEE 208, a post-filter 305 is enabled and the coarse carrier compensated signal is processed through the post-filter 305 as a pre-processing step for ISI mitigation. The post-filtered signal can be processed through a delay block 307. The delay block 307 delays the coarse carrier compensated signal to provide the same throughput as in the PN mitigation mode. The branch metrics are then calculated in the same BMCU 308.

As noted above, the BMCU 308 uses a same Euclidean distance metric for the branch metrics calculation in both modes, with an additional term as an extension for the PN mitigation mode.

Data distributor 310 gathers the calculated branch metrics for the parallel blocks and distribute them to individual TEEs 208.

A control logic 312 can control individual modules based on the mode of the TEE 208. The control logic 312 can include the selection module 250 or be used to control the selection module 250. As described above, the mode of operation can be predetermined, or selected based on channel conditions or based on estimation of statistics from the received symbol. For example, when an estimation of the ISI statistics indicates the presence of a significant amount of ISI and relatively low phase noise, then the module will be set in the ISI mitigation mode. Conversely, when the amount of ISI is low and the signal shows presences of significant residual phase noise, the PN mitigation mode will be set.

Upon enabling the modules in the ISI mitigation mode, the control logic 312 connects the received data to the path through the post-filter 305 and delay block 307. The control logic 312 provides an indication to the BMCU 308 of which parameters the Euclidean distance (ED) should be based on. The delay block 307 can ensure that when functioning in the ISI mitigation mode, the number of clock cycles required for the data to reach the BMCU 308 is the same as in the PN mitigation mode such that the throughput of the module remains the same regardless of the mode of operation.

Alternatively, upon enabling the modules in the PN mitigation mode, the received data are directed towards the phase shifter 304 followed by the slicer 306 to prepare for the residual phase noise estimation. The BMCU 308 is shared between both modes, where in the PN mitigation mode the control logic 312 provides an indication to the BMCU 308 of which parameters the Euclidean distance (ED) should be based on and to further add an additional term to account for phase transition probabilities.

Finally, based on the parameters used in the ACS processing for either ISI or PN mitigation mode, the TEEs 208 are directed by the control logic 312 to compute relevant APMs for each of the mode based on the respective state connectivity in the APM calculation.

It should be noted that in some embodiments such as the embodiment shown in FIG. 6, the branch metrics may be calculated before the TEE 208 and buffered to be used by the TEE 208. However in other embodiments, the branch metrics may be calculated on-the-fly and inside the TEE 208, such as the embodiment as shown in FIGS. 4 and 5. The two implementations are equivalent in terms of the algorithm, but differ in the hardware implementation. As well, some or all modules of the pre-processing of the coarse carrier compensated signal, including the phase rotation 304, the slicer 306, the post-filter 305, and/or the delay block 306, can be included in the TEE 208, or implemented outside the TEE 208.

Figure 7:
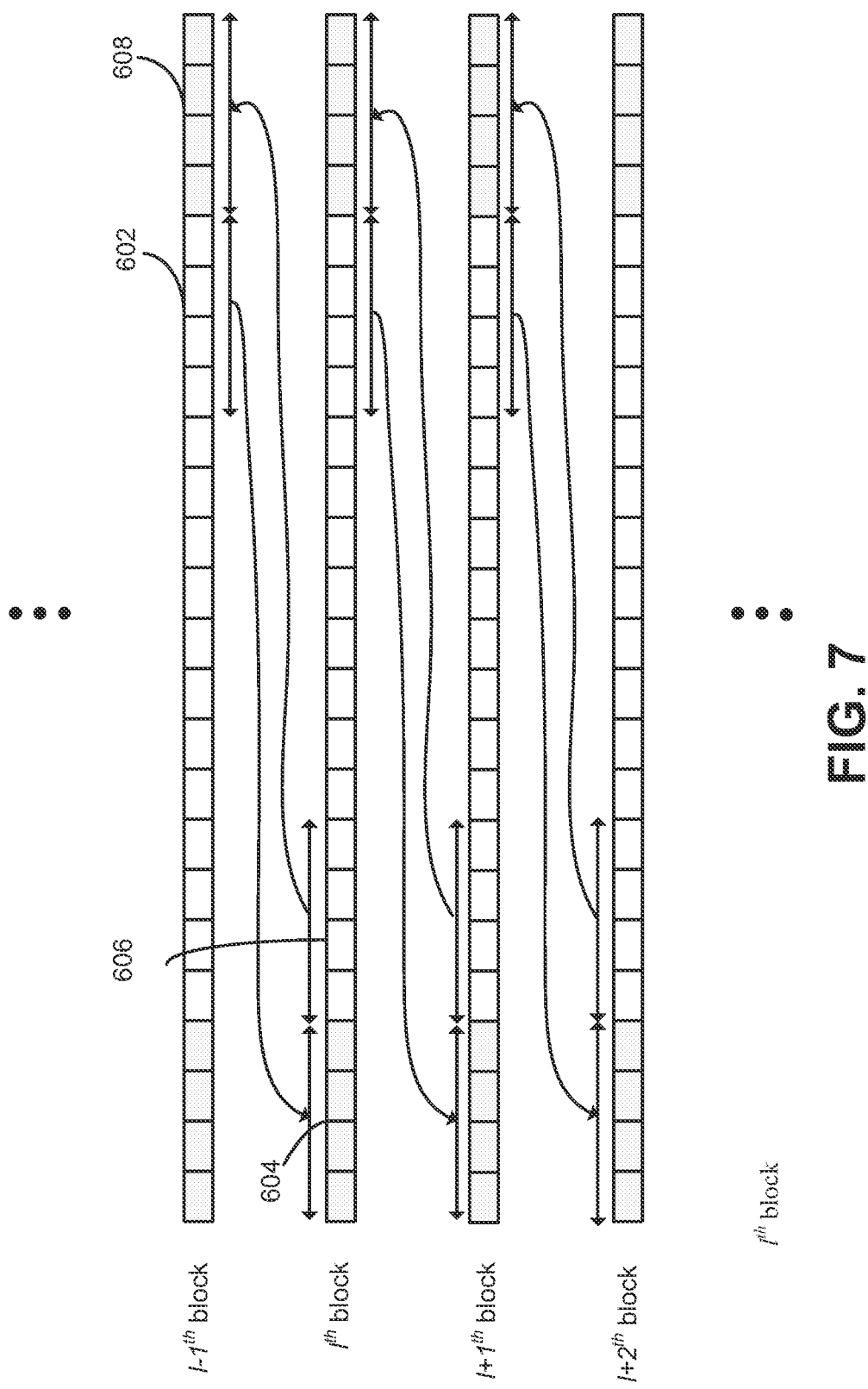
FIG. 7 shows an example of the symbol overlap for data continuity.

As noted above, in a parallel structure of the TEEs 208, each TEE 208 block can include a few symbols from the previous block for trellis initialization. FIG. 7 shows an example of the symbol overlap between blocks for data continuity. As shown in FIG. 7, an output frame of the coarse carrier compensated signal can be divided into P parallel blocks of symbols. Each of the P parallel blocks of symbols can be parallel processed in one of a plurality of parallel TEEs 208. An $l^{th}$ block of the P parallel blocks can include a plurality of last symbols 602 of a $(l-1)^{th}$ block for initialization 604 of a $l^{th}$ TEE. As well, a plurality of first symbols 606 of the $l^{th}$ block can be used for termination 608 of the $(l-1)^{th}$ block. In this way, no additional overhead or pilot symbols need to be added to existing frame structures, but data continuity can be maintained for both multiplicative and additive noise correlation.

In order to provide a high throughput expected for the next generation receivers or transceivers, such as those to be employed for 400 Gbps and upwards coherent optical systems, state reduction can be applied to the trellis in both modes, to reduce the number of states in the propagation of the trellis, compared to a full-state trellis. For a trellis with M states, state metrics for M states can be calculated but only a reduced set of the states are propagated for resource reduction. Because trellis states represent phases or possible combinations of symbols, states with relatively higher probabilities can be located in each trellis stage. Therefore, instead of state metric sorting for the purpose of state reduction (which is complicated for hardware implementation), the most probable state can be found by identifying the state having the best state metric (regardless of what specific function is used to compute the branch metrics), and a reduced set of states can be selected to be propagated to the next trellis stage of the trellis.

In accordance with the embodiment, the trellis state with the minimum state metric at a given trellis stage is obtained. In both ISI mode and the PN mode a reduced set of states close to the minimum metric state is propagated for the next stage. The reduced set of states is predetermined based on the mode of operation and may be constructed through any mechanism. The reduced set of states may be realized by a pre-calculated LUT that is predetermined for each mode. Such an approach allows for a sort-free reduced state processing for the TEE 208 for both ISI and RPN mitigations, and helps to reduce the computational burden of the TEE 208. The reduced computation enables processing at GHz speeds with a manageable hardware and power usage.

FIG. 8A is an example of the trellis state reduction scheme in the ISI mitigation mode; and FIG. 8B is an example of the trellis state reduction scheme in the PN mitigation mode.

In each of the modes, a state 802a, 802b having the minimum state metric can be located. A corresponding predetermined reduced set of states 804a, 804b is used for each mode to select the reduced set of states. For the PN mitigation mode, because trellis states represent phases, states with higher probability are assumed to be adjacent to each other. Therefore, a reduced set of states can be selected as a number (e.g., M/2) of closest states. For the ISI mitigation mode, the reduced state selection can be done by using the proximity in terms of their Euclidean distances.

Figure 9:
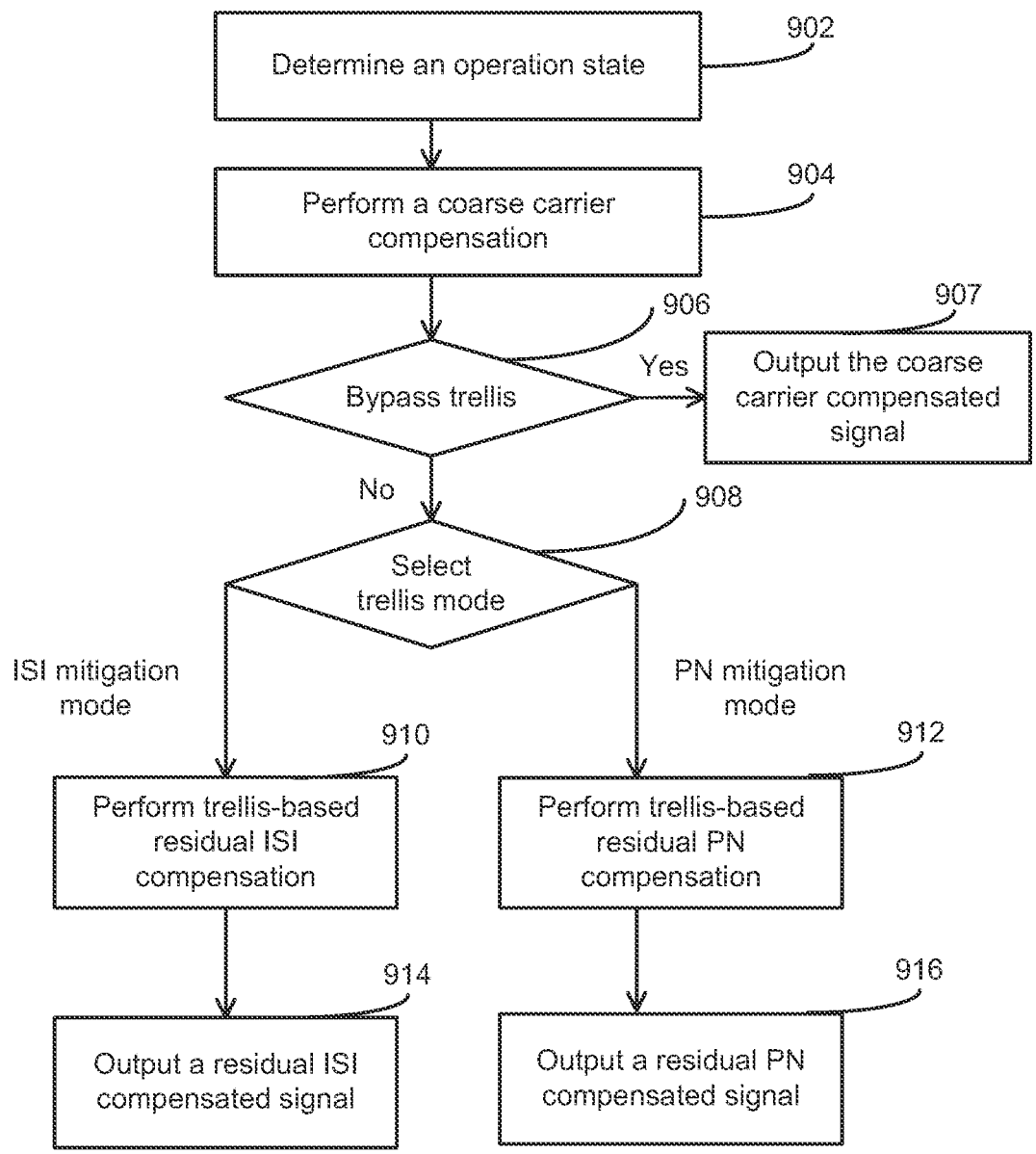
FIG. 9 is a flowchart of a method for digitally processing a modulated signal, according to an embodiment.

FIG. 9 is a flowchart of a method for digitally processing a modulated signal, according to an embodiment. An operation state of the equalization module 140 or the TEE 208 is determined (902). Once the operation state is determined, a mode of operation (either the ISI mitigation mode or the PN mitigation mode) of the equalization module 140 or the TEE 208 can be selected. Under certain channel conditions, the equalization module 140 or the TEE 208 can be bypassed. The operation state can be determined in one stage or in separate stages, at any suitable location prior to the equalization module 140. For example, an operation state of bypassing the equalization module 140 or the TEE 208 can be determined prior to the trellis mode selection, or at the same time. A coarse carrier compensation of the modulated signal is performed (904) to obtain a coarse carrier compensated signal. When the equalization module 140 or the TEE 208 is to be bypassed (906), the coarse carrier compensated signal may be output (907) bypassing the equalization module 140. When the equalization module 140 or the TEE 208 is not to be bypassed (906), the determined operation state can be used to select (908) the trellis mode.

When the determined operation state is a first mode (ISI mitigation mode), a trellis-based equalization is performed (910) to compensate a residual ISI of the coarse carrier compensated signal using the trellis-based equalization engine 208. The residual ISI compensated signal is then output (914) from the equalization module 140. When the determined operation state is a second mode (PN mitigation mode), a trellis-based equalization is performed (912) to compensate a residual RN of the coarse carrier compensated signal using the trellis-based equalization engine 208. The residual ISI compensated signal is then output (914) from the equalization module 140.

Figure 10:
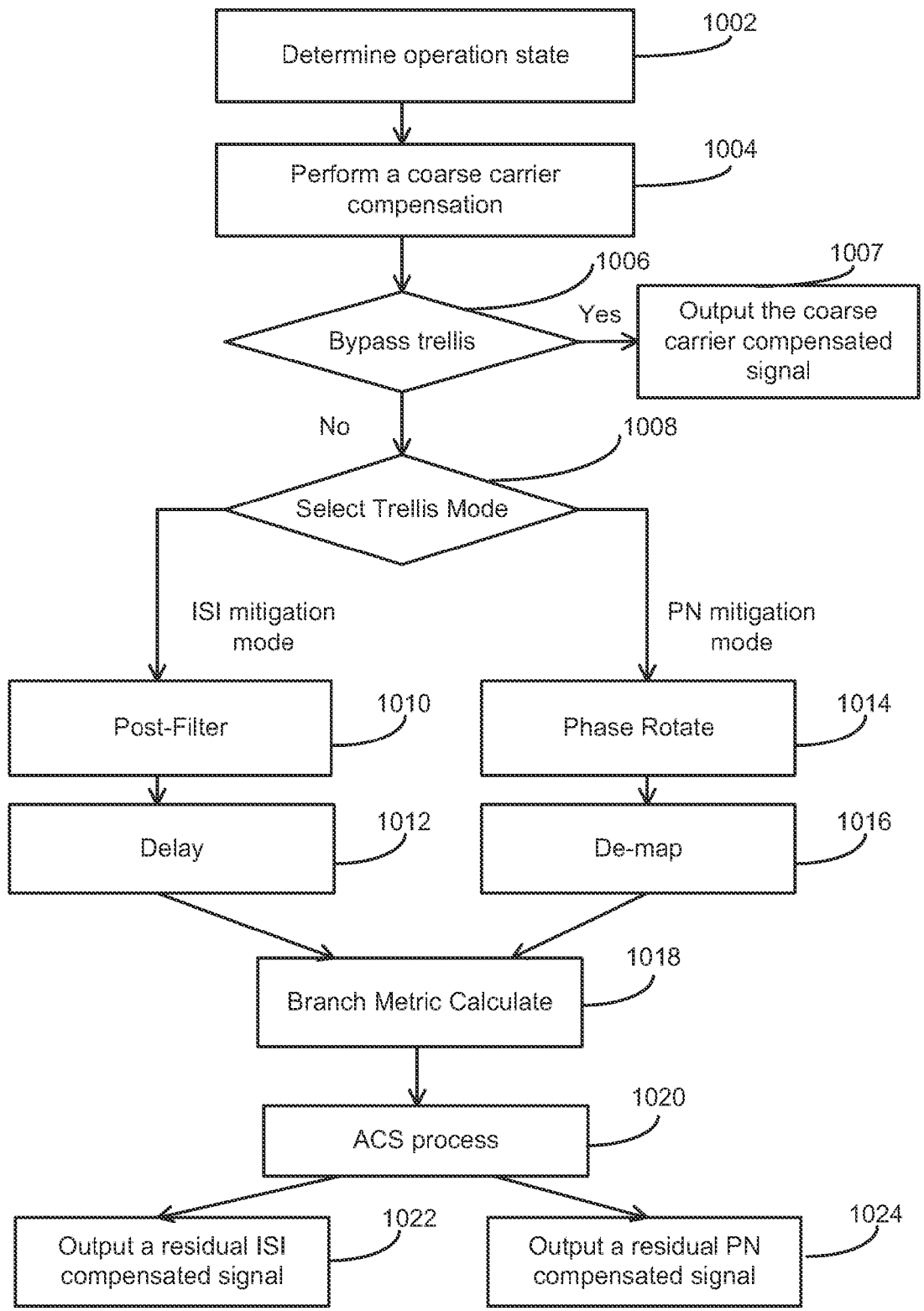
FIG. 10 is a flowchart of a method for digitally processing a modulated signal, according to another embodiment.

FIG. 10 is a flowchart of a method for digitally processing a modulated signal, according to another embodiment of the description. An operation state of the equalization module 140 or the TEE 208 is determined (1002). Once the operation state is determined, a mode of operation (either the ISI mitigation mode or the PN mitigation mode) of the equalization module 140 or the TEE 208 can be selected. Under certain channel conditions, the equalization module 140 or the TEE 208 can be bypassed. The operation state can be determined in one stage or in separate stages, at any suitable location prior to the equalization module 140. For example, an operation state of bypassing the equalization module 140 or the TEE 208 can be determined prior to the trellis mode selection, or at the same time. A coarse carrier compensation of the modulated signal is performed (1004) to obtain a coarse carrier compensated signal. When the equalization module 140 or the TEE 208 is to be bypassed (1006), the coarse carrier compensated signal may be output (1007) bypassing the equalization module 140. When the equalization module 140 or the TEE 208 is not to be bypassed (1006), the determined operation state can be used to select (1008) the trellis mode. When the determined operation state is a first mode (ISI mitigation mode), the coarse carrier compensated signal is post-filtered (1010) and delayed (1012) to provide the same throughput as in the second mode. When the determined operation state is a second mode (PN mitigation mode), the coarse carrier compensated signal is phase-rotated (1014) according to the possible residual phase noise corresponding to the state, and the rotated version of the coarse carrier compensated signal is de-mapped (1016) to a constellation point in a modulation constellation of the modulated signal. Subsequently, regardless of the selected mode, the branch metric is calculated (1018) using the same Euclidean distance metric. In the ISI mitigation mode, the Euclidean distance metric is calculated between the post-filtered signal and the possible weighted sum of the current symbol and the at least one previous symbol. In the PN mitigation mode, the Euclidean distance metric is calculated between the rotated version of the coarse carrier compensated signal and the constellation point. An additional term is used as an extension for branch metric in the PN mitigation mode. The same ACS processing (1020) is carried out, and subsequently either a residual ISI compensated signal is provided (1022) in the ISI mitigation mode or a residual PN compensated signal is provided (1024) in the PN mitigation mode.

As described above, the output frame of the coarse carrier compensated signal can be divided into P parallel blocks of symbols and parallel processed in a plurality of parallel TEEs 208. The TEE 208 may be configured to propagate from a trellis stage to a next trellis stage based on a reduced set of states, where the reduced set of states is selected from a state having a minimum metric in the trellis stage.

The described methods and apparatuses provide high-speed implementations that are able to reuse hardware for the same underlying trellis to address both ISI and PN impairments.

It should be noted that while the various parameters of the TEE 208 are described above with reference to specific numbers, these specific numbers are not meant to be limiting and other suitable numbers may be used. Such parameters include but not limited to the number of states M in the trellis, the minimum residual phase jumps, $\phi_k$-$\phi_l$, the channel memory or the number of branches N, the trace back length L, the number P of parallel TEEs, the number of initialization trellis stages, the number of termination trellis stages, etc.

It should also be noted that while the above description is provided with specific reference to a coherent optical transceiver or receiver, it should be understood that the described methods and apparatuses can be applied to other communication systems that are impaired by ISI or high phase noise.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for digitally processing a modulated signal, the method comprising:
   determining an operation state of a trellis-based equalization engine;
   performing a coarse carrier compensation of the modulated signal to obtain a coarse carrier compensated signal;
   when the determined operation state is a first mode of the trellis-based equalization engine, performing a trellis-based equalization to compensate a residual inter symbol interference of the coarse carrier compensated signal using the trellis-based equalization engine; and when the determined operation state is a second mode of the trellis-based equalization engine, performing a trellis-based equalization to compensate a residual phase noise of the coarse carrier compensated signal using the trellis-based equalization engine, wherein the trellis-based equalization engine uses a trellis structure, in the first mode each state in the trellis structure represents a possible weighted sum of a group of received symbols, and in the second mode each state in the trellis structure represents a possible residual phase noise of a received symbol.

2. The method as defined in claim 1, further comprising:
dividing an output frame of the coarse carrier compensated signal into P parallel blocks of symbols; and
parallel processing each of the P parallel blocks of symbols in one of a plurality of parallel trellis-based equalization engines.

3. The method as defined in claim 2, wherein a $l^{th}$ block of the P parallel blocks comprises a plurality of last symbols of a $(l-1)^{th}$ block for initialization of a $l^{th}$ trellis-based equalization engine.

4. The method as defined in claim 1, wherein the trellis-based equalization engine uses a same Euclidean distance metric for both the first mode and the second mode.

5. The method as defined in claim 1, wherein the trellis structure is comprised of a same number of states and a same trace back length for both the first mode and the second mode.

6. The method as defined in claim 1, wherein the operation state is independent from a modulation format of the modulated signal.

7. The method as defined in claim 5, wherein in the first mode each state in the trellis structure represents a possible weighted sum of a current symbol and at least one previous symbol.

8. The method as defined in claim 7, wherein in the first mode performing the trellis-based equalization further comprises:
post-filtering the coarse carrier compensated signal to obtain a post-filtered signal; and
calculating a Euclidean distance metric between the post-filtered signal and the weighted sum of the current symbol and the at least one previous symbol.

9. The method as defined in claim 1, further comprising delaying the coarse carrier compensated signal in the first mode to provide a same throughput as in the second mode.

10. The method as defined in claim 1, wherein in the second mode performing the trellis-based equalization comprises, for each state in the trellis structure,
phase-rotating the coarse carrier compensated signal according to the residual phase noise corresponding to the state;
mapping the rotated version of the coarse carrier compensated signal to a constellation point in a modulation constellation of the modulated signal;
calculating a Euclidean distance metric between the rotated version of the coarse carrier compensated signal and the constellation point;
calculating a probability of a phase noise jump corresponding to a branch leading to the state; and
obtaining a branch metric of the branch based on a sum computation of the Euclidean distance metric and the probability of the phase noise jump.

11. The method as defined in claim 1, wherein the possible residual phase noises corresponding to the states of the trellis structure have uniformly distributed values.

12. The method as defined in claim 1, wherein the possible residual phase noises corresponding to the states of the trellis structure have uniformly distributed arctan values.

13. The method as defined in claim 1, wherein the operation state of the trellis-based equalization engine includes a bypass state of the trellis-based equalization engine.

14. The method as defined in claim 1, wherein the trellis-based equalization engine is configured to propagate the trellis structure from a trellis stage to a next trellis stage based on a reduced set of states, wherein the reduced set of states is selected from a state having a minimum metric in the trellis stage and the reduced set of states is predetermined based on whether the determined operation state is the first mode or the second mode of the trellis-based equalization engine.

15. A digital signal processing apparatus, the digital processing apparatus comprising:
a coarse carrier recovery module for performing a coarse carrier compensation of a received modulated signal; and
a trellis-based equalization module selectable between a first mode for performing a trellis-based equalization to compensate a residual inter-symbol interference of the received modulated signal and a second mode for performing a trellis-based equalization to compensate a residual phase noise of the received modulated signal,
wherein the trellis-based equalization uses a trellis structure, in the first mode each state in the trellis structure represents a possible weighted sum of a group of received symbols, and in the second mode each state in the trellis structure represents a possible residual phase noise of a received symbol.

16. The digital signal processing apparatus as defined in claim 15, wherein an output frame from the coarse carrier recovery module is divided into P parallel blocks, and the digital processing apparatus comprises P parallel trellis-based equalization modules each configured to process one of the P parallel blocks.

17. The digital signal processing apparatus as defined in claim 16, wherein a $l^{th}$ block of the P parallel blocks comprises a plurality of last symbols of a $(l-1)^{th}$ block for initialization of a $l^{th}$ trellis-based equalization module.

18. The digital signal processing apparatus as defined in claim 15, wherein the trellis-based equalization module uses a same Euclidean distance metric for both the first mode and the second mode.

19. The digital signal processing apparatus as defined in claim 15, wherein the trellis structure is comprised of a same number of states and a same trace-back length for both the first mode and the second mode.

20. The method as defined in claim 15, wherein the mode is independent from a modulation format based on which the modulated signal is modulated.

21. The digital processing apparatus as defined in claim 19, wherein in the first mode each state in the trellis structure represents a possible weighted sum of a current symbol and at least one previous symbol.

22. The digital signal processing apparatus as defined in claim 21, wherein in the first mode the trellis-based equalization module is configured to:
post-filter an output from the coarse carrier recovery module to obtain a post-filtered signal; and calculate a Euclidean distance metric between the post-filtered signal and the possible weighted sum of the current symbol and the at least one previous symbol.

23. The digital signal processing apparatus as defined in claim 15, wherein in the first mode, an output from the coarse carrier recovery module is delayed to provide a same throughput as in the second mode.

24. The digital signal processing apparatus as defined in claim 15, wherein in the second mode the trellis-based equalization module is configured to, for each state in the trellis structure, phase-rotate an output from the coarse carrier recovery module according to the possible residual phase noise corresponding to the state;

map the rotated version of the output from the coarse carrier recovery module to a constellation point in a modulation constellation of the received modulated signal;

calculate a Euclidean distance metric between the rotated version of the output from the coarse carrier recovery module and the constellation point;

calculate a probability of a phase noise jump corresponding to a branch leading to the state; and obtain a branch metric of the branch based on a sum computation of the Euclidean distance metric and the probability of the phase noise jump.

25. The digital signal processing apparatus as defined in claim 15, wherein the possible residual phase noises corresponding to the states of the trellis structure have uniformly distributed values.

26. The digital signal processing apparatus as defined in claim 15, wherein the possible residual phase noises corresponding to the states of the trellis structure have uniformly distributed values.

27. The digital signal processing apparatus as defined in claim 15, wherein the trellis-based equalization module is bypass-able.

28. The digital signal processing apparatus as defined in claim 15, wherein is configured to propagate the trellis structure from a trellis stage to a next trellis stage based on a reduced set of states, wherein the reduced set of states is selected from a state having a minimum metric in the trellis stage and the reduced set of states is predetermined based on whether the trellis-based equalization module is in the first mode or the second mode.

* * * * *